US005709806A

United States Patent [19]

Chang

[11] Patent Number: 5,709,806

[45] Date of Patent: Jan. 20, 1998

[54] METHOD OF MANUFACTURING A HOT-STAMPED DECAL

[76] Inventor: Chih Chin Chang, 6F-6,186, Section 1, Wen Hsin Rd., Taichung, Taiwan

[21] Appl. No.: 753,279

[22] Filed: Nov. 22, 1996

[51] Int. Cl.$^6$ .......... B32B 31/12

[52] U.S. Cl. .......... 216/41; 427/147; 427/404; 427/407.1; 101/27

[58] Field of Search .......... 427/147, 404, 427/407.1; 106/31, 33, 31.65; 101/9, 27; 216/41

[56] References Cited

U.S. PATENT DOCUMENTS 5,453,155 9/1995 Hung .......... 216/41

5,580,604 12/1996 Chang .......... 427/147

*Primary Examiner*—Edgar S. Burr

*Assistant Examiner*—Dave A. Ghatt

[57] ABSTRACT

A method of manufacturing a hot-stamped decal includes seven steps which are: step (a): to prepare a metalized polyester film comprising a metalized layer disposed on a top surface thereof, a clear polyester sheet disposed to an under side of the metalized layer, an adhesive layer disposed to an under side of the clear polyester sheet and a release sheet disposed to an under side of the adhesive layer; step (b): to prepare crystallized particles; step (c): to add the crystallized particles into a volatile solution to let the crystallized particles in the volatile solution be in an over-saturated status; step (d): to add ink into the over-saturated solution of step (c); step (e): to use the solution of step (d) to execute a printing process on the metalized layer to form a pattern thereon composed of a printed ink layer; step (f): to mop the printed ink layer with an alkaline corrosive solution to corrode the top surface of the metalized layer not covered by the printing ink layer; and step g): a neutralization reaction being executed by mopping an acid solution on the metalized layer after the metalized layer is corroded completely.

4 Claims, 4 Drawing Sheets

METHOD OF MANUFACTURING A HOT-STAMPED DECAL

BACKGROUND OF THE INVENTION

1. Field of the Invention

The present invention relates to a method of manufacturing a hot-stamped decal and more particularly, to a method using crystallized particles such as mint or camphor particles resolved in ink which is printed on a metalized layer so as to form a bright pattern on the metalized layer.

2. Brief Description of the Prior Art

Generally, a conventional hot-stamped decal is manufactured as shown in FIG. 1, wherein an embossed plate 70 made of zinc is prepared in which a desired pattern is defined. The embossed plate 70 is covered with a hot-stamped film 71 and a heat pressing process is executed thereto to form the pattern on the hot-stamped film 71. Then a clear polyester sheet 72 is adhered to the hot-stamped film 71 and the pattern is shown through the clear polyester sheet 72. The hot-stamped decal is utilized by removing the clear polyester sheet 72 from the hot-stamped film 71 and adhering the hot-stamped film 71 to a desired object.

However, such a method includes the following shortcomings:

(1) The material, zinc, used to make the embossed plate 70 is an expensive metal.

(2) It needs a skilled person to take a lot of time to complete the embossed plate 70 if a complicated pattern is desired to be formed on the embossed plate 70.

(3) The changes of temperature tend to alter its size, so that it cannot produce an exquisite hot-stamped decal.

(4) It is difficult to include multiply colors in the hot-stamped film except a complicated process is taken which thereby restricts its usage.

The present invention intends to provide an easier method to produce a hot-stamped decal to mitigate and/or obviate the above-mentioned problems.

SUMMARY OF THE INVENTION

The present invention provides a method of manufacturing a hot-stamped decal and which includes seven steps which are:

step (a): to prepare a metalized polyester film comprising a metalized layer disposed on a top surface thereof, a clear polyester sheet disposed to an under side of the metalized layer, an adhesive layer disposed to an under side of the clear polyester sheet and a release sheet disposed to an under side of the adhesive layer;

step (b): to prepare crystallized particles;

step (c): to add the crystallized particles into a volatile solution to let the crystallized particles in the volatile solution be in an over-saturated status;

step (d): to add ink into the over-saturated solution of step (c);

step (e): to use the solution of step (d) to execute a printing process on the metalized layer to form a pattern thereon composed of a printed ink layer;

step (f): to mop the printed ink layer with an alkaline corrosive solution to corrode the top surface of the metalized layer not covered by the printing ink layer; and step (g): a neutralization reaction being executed by mopping an acid solution on the metalized layer after the metalized layer is corroded completely.

It is an object of the present invention to provide a method of manufacturing a hot-stamped decal which uses crystallized particles such as mint or camphor particles to form a pattern on the hot-stamped decal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
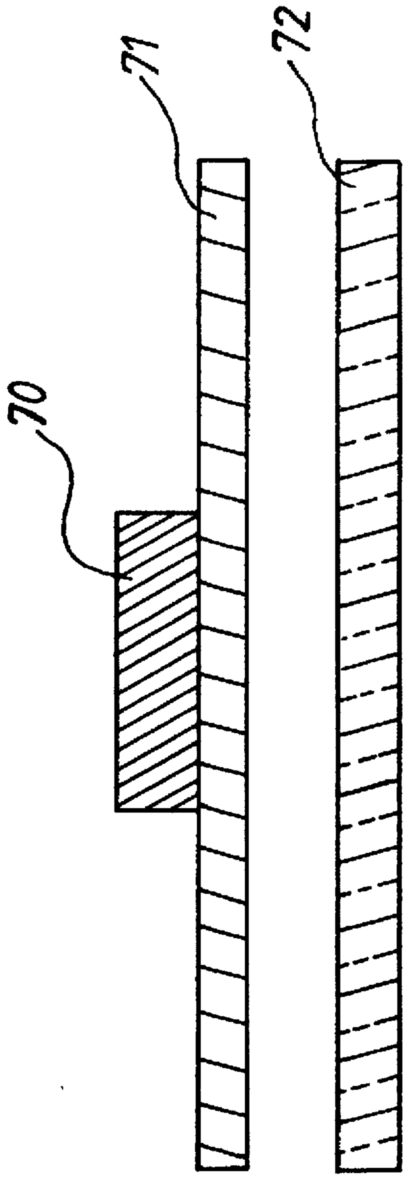
FIG.1 PRIOR ART
FIG. 1 is an illustrative view to show a manufacturing processes of a conventional hot-stamped decal.
Figure 2:
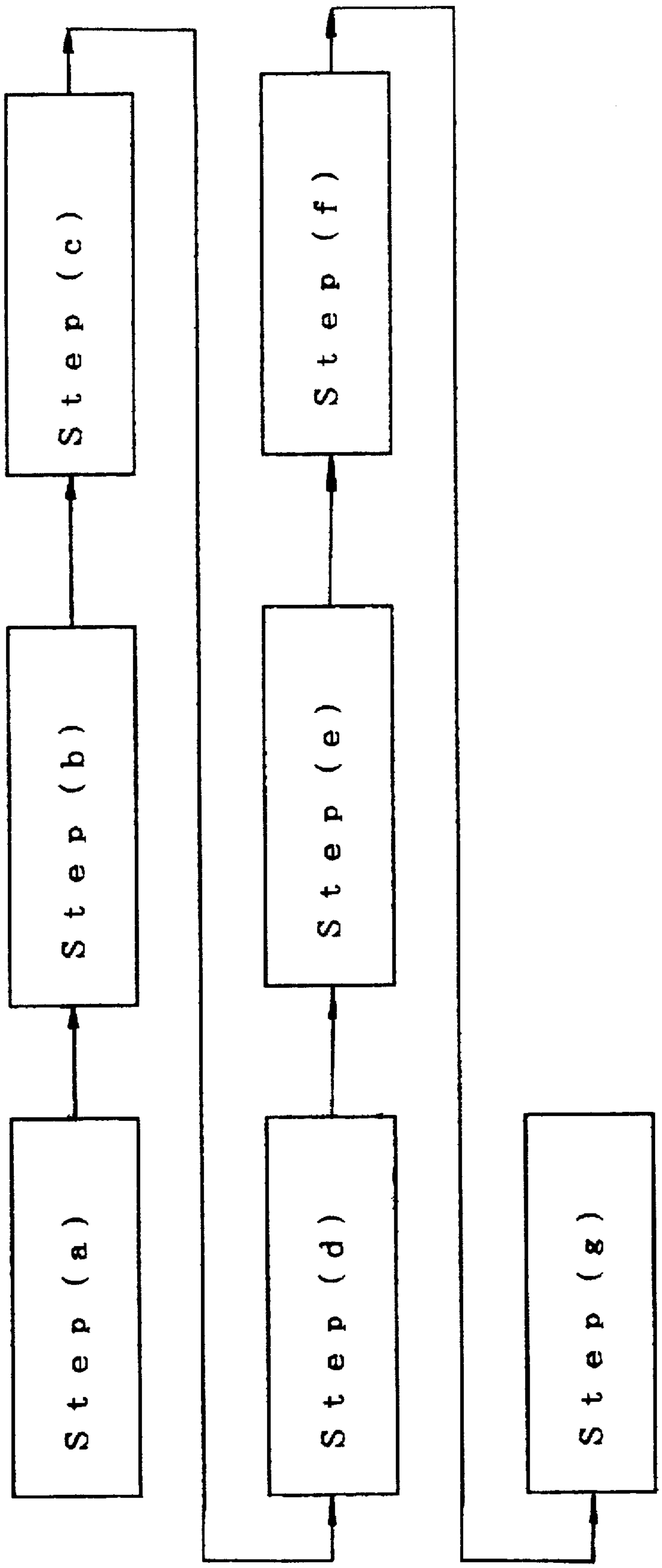
FIG. 2 is a flow chart of a method of manufacturing a hot-stamped decal in accordance with the present invention.
Figure 3:
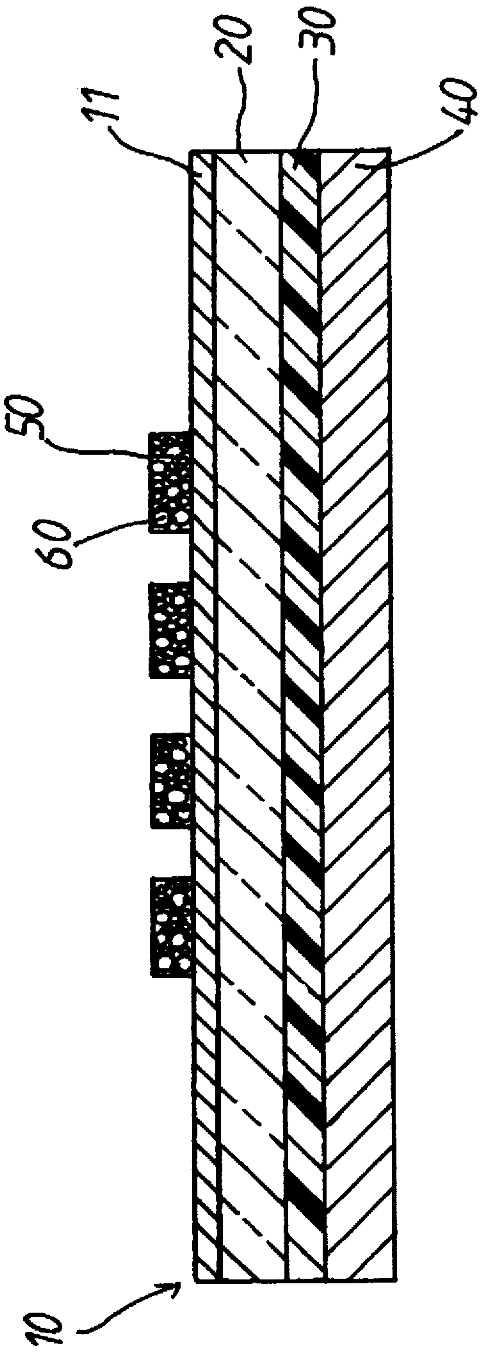
FIG. 3 is a side elevational view in section of a metalized polyester film after printing a pattern thereon in accordance with the present invention.
Figure 4:
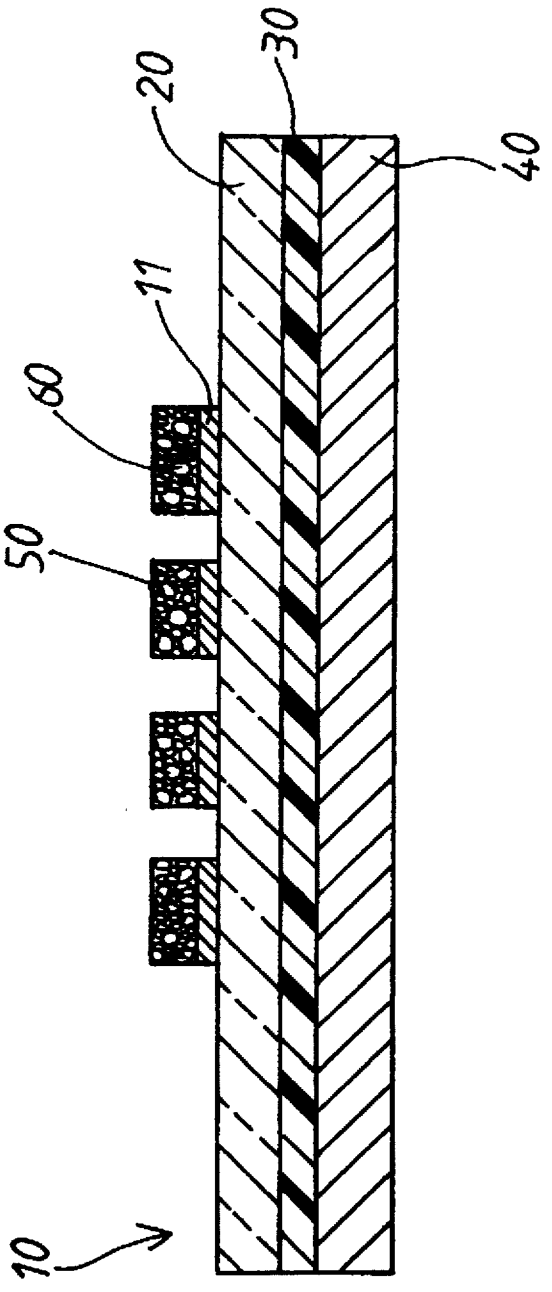
FIG. 4 is a side elevational view in section of the metalized polyester film after executing an corrosion process thereon.

Referring to FIGS. 2 through 4, a method of manufacturing a hot-stamped decal in accordance with the present invention generally includes the following steps:

step (a): to prepare a metalized polyester film 10 which comprises a metalized layer 11 disposed on a top surface thereof, a clear polyester sheet 20 disposed to an under side of the metalized layer 11, an adhesive layer 30 disposed to an under side of the clear polyester sheet 20 and a release sheet 40 disposed to an under side of the adhesive layer 30;

step (b): to prepare crystallized particles 60 such as mint particles or camphor particles;

step (c): to add the crystallized particles 60 into a volatile solution (not shown) such as ethers, alcohols or esters solution, to let the crystallized particles 60 in the volatile solution be in an over-saturated status;

step (d): to add ink into the over-saturated solution of step (c);

step (e): to use the result solution of step (d) to execute a printing process (an intaglio printing process or a relief printing process) on the metalized layer 11 to form a pattern thereon which comprises the crystallized particles 60 and a printed ink layer 50;

step (f): to mop the printed ink layer 50 with an alkaline corrosive solution to corrode the top surface of the metalized layer 11 not covered by the printed ink layer 50 wherein the ethers, alcohols or the esters is volatitized during this step; and step (g): a neutralization reaction being executed by mopping an acid solution on the metalized layer 11 after the metalized layer 11 is corroded completely.

The hot-stamped decal made by the method can have variety of colors and patterns by adjusting an amount of he particles 60 and the ink.

Although the invention has been explained in relation to its preferred embodiment, it is to be understood that many other possible modifications and variations can be made without departing from the spirit and scope of the invention as hereinafter claimed.

What is claimed is:

1. A method of manufacturing a hot-stamped decal and comprising the following steps:

step (a): preparing a metalized polyester film comprising a metalized layer disposed on a top surface thereof, a clear polyester sheet disposed to an under side of said metalized layer, an adhesive layer disposed to an under side of said clear polyester sheet and a release sheet disposed to an under side of said adhesive layer;

step (b): preparing crystallized particles;

step (c): adding said crystallized particles into a volatile solution to let said crystallized particles in said volatile solution be in an over-saturated status;

step (d): adding ink into said over-saturated solution of step (c);

step (e): using said solution of step (d) to execute a printing process on said metalized layer to form a pattern thereon composed of a printed ink layer;

step (f): mopping said printed ink layer with an alkaline corrosive solution to corrode said top surface of said metalized layer not covered by said printed ink layer; and step (g): a neutralization reaction being executed by mopping an acid solution on said metalized layer after said metalized layer is corroded completely.

2. The method as claimed in claim 1 wherein said crystallized particles are camphor.

3. The method as claimed in claim 1 wherein said crystallized particles are mint.

4. The method as claimed in claim 1 wherein said volatile solution includes ethers therein.

* * * * *